(12) United States Patent
Kratschmer et al.

(10) Patent No.: US 6,596,840 B1
(45) Date of Patent: Jul. 22, 2003

(54) METHOD FOR PRODUCING MODIFIED POLYCARBONATES

(75) Inventors: Silke Kratschmer, Krefeld (DE); Uwe Hucks, Alpen (DE); Lothar Bunzel, Kempen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/031,630

(22) PCT Filed: Jul. 6, 2000

(86) PCT No.: PCT/EP00/06379

§ 371 (c)(1), (2), (4) Date: Jan. 15, 2002

(87) PCT Pub. No.: WO01/05866

PCT Pub. Date: Jan. 25, 2001

(30) Foreign Application Priority Data

Jul. 19, 1999 (DE) .......................... 199 33 132

(51) Int. Cl.$^7$ ................................. C08G 64/00
(52) U.S. Cl. ................. 528/196; 502/164; 502/198
(58) Field of Search .................. 528/196, 198; 502/164

(56) References Cited

U.S. PATENT DOCUMENTS

| | | | |
|---|---|---|---|
| 5,151,491 A | 9/1992 | Sakashita et al. | ............ 528/199 |
| 5,276,129 A | 1/1994 | Sakashita et al. | ............ 528/198 |
| 6,187,896 B1 * | 2/2001 | Nakajima et al. | |

FOREIGN PATENT DOCUMENTS

| | | |
|---|---|---|
| DE | 196 46 401 | 5/1998 |
| EP | 0 703 261 | 3/1996 |
| EP | 0 726 285 | 8/1996 |
| EP | 0 908 484 | 4/1999 |

\* cited by examiner

*Primary Examiner*—Terressa M. Boykin
(74) *Attorney, Agent, or Firm*—Joseph C. Gil; Aron Preis

(57) ABSTRACT

A process for the synthesis of polycarbonate is disclosed. The process entails reacting in the presence of at least one phosphonium salt as catalyst, at least one diphenol, at least one carbonic acid diester, and at least one alkyl group-substituted phenol chain terminator. The chain terminator is introduced in free form or as a transesterifiable compound under the conditions of the synthesis. The polycarbonate thus produced is suitable for preparing a variety of molded articles.

19 Claims, No Drawings

METHOD FOR PRODUCING MODIFIED POLYCARBONATES

The present invention provides a melt transesterification process for the production of polycarbonates.

The production of aromatic polycarbonates using the melt transesterification process is known from the literature and is described, for example, in *Encyclopedia of Polymer Science*, volume 10 (1969), *Chemistry & Physics of Polycarbonates, Polymer Reviews*, H. Schnell, volume 9, John Wiley & Sons Inc. (1964) and, on the basis of DE 1 031 512, described in various patents. Pat. EP 360 578demonstrates that the end groups of a polycarbonate which has been produced by melt transesterification may be exchanged by addition of a chain terminator. It has, however, been found that only a proportion of the introduced quantity of chain terminator actually remains as an end group in the polycarbonate. Since the end groups have a substantial influence upon mechanical properties, in particular of grades of PC having an elevated chain terminator content, in particular low molecular weight and branched grades of PC, it is desirable to ensure that the phenol end groups are replaced as completely as possible by other more suitable phenols. Moreover, when the phenol arising during polycondensation is removed from the process by distillation, it is contaminated by the chain terminator if this latter substance has not been completely incorporated. It is accordingly desirable to ensure maximally complete incorporation not only with regard to an elevated reaction yield, but also with regard to reuse of the phenol removed by distillation.

The object accordingly arose of providing a melt transesterification process which permits the production of polycarbonates, some of the end groups of which consist of phenols other than phenol, wherein as much of the introduced chain terminator as possible should be incorporated.

This object is achieved by a process for the production of polycarbonates from bisphenols, preferably from bisphenol A, and carbonic acid diesters, in the presence of a phenol suitable as a chain terminator, wherein the phenol used as chain terminator may be introduced in free form or as a compound transesterifiable under the conditions of synthesis, which process is characterised in that phosphonium salts, optionally combined with other catalysts, in particular sodium ions, are used as the catalyst.

For the purposes of the process according to the invention, phosphonium salts are those of the formula (I), (I)

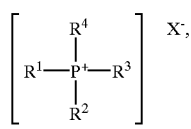

wherein $R^{1-4}$ may be identical or different $C_1$–$C_{18}$ alkyls, $C_6$–$C_{14}$ aryls, $C_7$–$C_{12}$ aralkyls or $C_5$–$C_6$cycloalkyls, preferably methyl or $C_6$–$C_{14}$ aryls, particularly preferably methyl or phenyl, and $X^-$ may be an anion such as sulfate, hydrogen sulfate, hydrogen carbonate, carbonate, acetate, hydridoborate, hydrogen phosphate, a halide, preferably fluoride, chloride or bromide, an alkoxide of the formula OR, wherein R is $C_6$–$C_{14}$ aryl, $C_7$–$C_{12}$ aralkyl, preferably phenyl. Preferred catalysts are
tetraphenylphosphonium fluoride
tetraphenylphosphonium tetraphenylhydridoborate,
particularly preferably tetraphenylphosphonium phenolate.

Sodium ion catalysts which may be used are hydroxides, hydrogen carbonates, carbonates, alkoxides, acetates, hydridoborates, hydrogen phosphates and hydrides, preferably hydroxides and alkoxides, particularly preferably the sodium salts of the phenols and bisphenols as mentioned in relation to the bisphenols and chain terminators and the sodium salt of phenol itself, very particularly preferably the sodium salt of 2,2-bis-(4-hydroxyphenyl)propane.

Alkylphenols suitable as chain terminators for the purposes of the process according to the invention are those of the formula (II), (II)

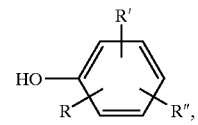

wherein R, R' and R" may mutually independently comprise H, optionally branched $C_1$–$C_{34}$ alkyl/cycloalkyl, $C_7$–$C_{34}$ alkaryl or $C_6$–$C_{34}$ aryl, for example
o-n-butylphenol, m-n-butylphenol, p-n-butylphenol,
o-isobutylphenol, m-isobutylphenol, p-isobutylphenol,
o-tert.-butylphenol, m-tert.-butylphenol, p-tert.-butylphenol,
o-n-pentylphenol, m-n-pentylphenol, p-n-pentylphenol,
o-n-hexylphenol, m-n-hexylphenol, p-n-hexylphenol,
o-cyclohexylphenol, m-cyclohexylphenol, p-cyclohexylphenol,
o-phenylphenol, m-phenylphenol, p-phenylphenol,
o-isooctylphenol, m-isooctylphenol, p-isooctylphenol,
o-n-nonylphenol, m-n-nonylphenol, p-n-nonylphenol,
o-cumylphenol, m-cumylphenol, p-cumylphenol,
o-naphthylphenol, m-naphthylphenol, p-naphthylphenol,
2,5-di-tert.-butylphenol, 2,4-di.-tert.-butylphenol, 3,5-di-tert.-butylphenol,
2,5-dicumylphenol, 3,5-dicumylphenol,
4-phenoxyphenol, 2-phenoxyphenol, 3-phenoxyphenol,
3-pentadecylphenol, 2-pentadecylphenol, 4-pentadecylphenol,
2-phenylphenol, 3-phenylphenol, 4-phenylphenol,
tritylphenol, 3-triphenylmethylphenol, 2-triphenylmethylphenol,
as well as benzotriazole derivatives of the general formula (III)

(III)

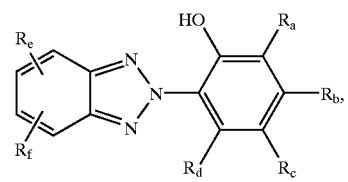

with the above-stated meaning of R, R' and R" for $R_a$–$R_f$ and chromane compounds such as

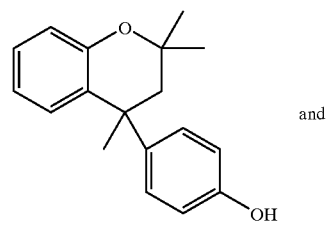

and

-continued

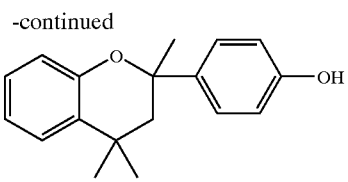

preferably low-boiling phenols such as tritylphenol, cumylphenol, phenoxyphenol, pentadecylphenol or chromanes,
or also as compounds transesterifiable under the conditions of synthesis, such as for example carbonates, oxalates, o-carboxylic acid esters or the like, with preferred compounds being free phenols or carbonic acid diesters of the formula (IV)

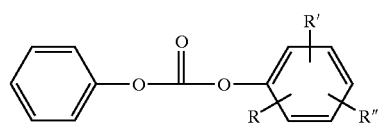

(IV)

and the formula (V),

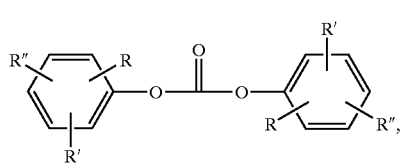

(V)

wherein R, R' and R" correspond to those of the formula (II). Phenols or transesterifiable substances may be added to the synthesis individually or as a mixture. Preferred mixtures are those including diphenyl carbonate. Using the process according to the invention, it is possible to add the phenol or phenol-bearing compound at any time during the reaction, preferably at the beginning of the reaction, and addition may be divided into two or more portions. The entire proportion of carbonic acid esters is 100–130 mol %, preferably 103–120 mol %, relative to the dihydroxy compound.

When producing polycarbonates using the process according to the invention, the chain terminator is preferably added as an alkylphenol at a rate of 0.4–17 mol %, preferably of 1.3–8.6 mol % (relative to the dihydroxy compound). This addition may be made not only before the reaction but also entirely or in part during the reaction.

Dihydroxy compounds for the purposes of the process according to the invention are those of the formula (VI)

HO—Z—OH  (VI)

in which Z is an aromatic residue having 6 to 30 C atoms, which residue may contain one or more aromatic rings, may be substituted and may contain aliphatic or cycloaliphatic residues or alkylaryls or heteroatoms as linking members.

Examples of dihydroxy compounds of the formula (VI) are
hydroquinone,
resorcinol,
dihydroxydiphenyls,
bis-(hydroxyphenyl)alkanes,
bis-(hydroxyphenyl)cycloalkanes,
bis-(hydroxyphenyl) sulfides,
bis-(hydroxyphenyl) ethers,
bis-(hydroxyphenyl) ketones,
bis-(hydroxyphenyl) sulfones,
bis-(hydroxyphenyl) sulfoxides,
α,α'-bis-(hydroxyphenyl)diisopropylbenzenes
together with the ring-alkylated and ring-halogenated compounds thereof.

These and further suitable other diphenols are described, for example, in U.S. Pat. Nos. 3 028 365, 3 148 172, 3 275 601, 2 991 273, 3 271 367, 3 062 781, 2 970 131 and 2 999 846, in DE-OS 1 570 703, DE-OS 2 063 050, DE-OS 2 063 052, DE-OS 2 211 0956, French patent 1 561 518 and in the monograph by H. Schnell, *Chemistry & Physics of Polycarbonates*, Interscience Publishers, New York 1964.

Preferred diphenols are, for example:
4,4'-dihydroxydiphenyl,
2,2-bis-(4-hydroxyphenyl)propane,
2,4-bis-(4-hydroxyphenyl)-2-methylbutane,
1,1-bis-(4-hydroxyphenyl)cyclohexane,
1,1-bis-(4-hydroxyphenyl)-4-methylcyclohexane,
α,α'-bis-(4-hydroxyphenyl)-p-diisopropylbenzene,
α,α'-bis-(4-hydroxyphenyl)-m-diisopropylbenzene,
bis-(4-hydroxyphenyl) sulfone,
bis-(4-hydroxyphenyl)methane,
1,1-bis-(4-hydroxyphenyl)-3,3,5-trimethylcyclohexane,
2,2-bis-(2,6-dimethyl-4-hydroxyphenyl)propane,
2,2-bis-(4-hydroxyphenyl)hexafluoropropane,
1,1-(4-hydroxyphenyl)-1-phenylethane,
bis-(4-hydroxyphenyl)diphenylmethane,
dihydroxydiphenyl ether,
4,4'-thiobisphenol,
1,1-bis-(4-hydroxyphenyl)-1-(1-naphthyl)ethane,
1,1-bis-(4-hydroxyphenyl)-1-(2-naphthyl)ethane,
2,3-dihydroxy-3-(4-hydroxyphenyl)-1,1,3-trimethyl-1H-indene-5-ol,
2,3-dihydroxy-1-(4-hydroxyphenyl)-1,3,3-trimethyl-1H-indene-5-ol,
2,2',3,3'-tetrahydro-3,3,3',3'-tetramethyl-1,1'-spirobi[1H-indene]-5,5'-diol.

Particularly preferred compounds are resorcinol,
1,1-bis-(4-hydroxyphenyl)-1-(1-naphthyl)ethane,
1,1-bis-(4-hydroxyphenyl)-1-(2-naphthyl)ethane,
2,2-bis-(4-hydroxyphenyl)propane,
α,α'-bis-(4-hydroxyphenyl)-p-diisopropylbenzene,
α,α'-bis-(4-hydroxyphenyl)-m-diisopropylbenzene,
1,1-bis-(4-hydroxyphenyl)cyclohexane,
1,1-bis-(4-hydroxyphenyl)-3,3,5-trimethylcyclohexane,
bis-(4-hydroxyphenyl)diphenylmethane,
4,4'-dihydroxydiphenyl.

It is possible both to use one diphenol of the formula (VI), resulting in the formation of homopolycarbonates, and to use two or more diphenols of the formula (VI), resulting in the formation of copolycarbonates.

In the process according to the invention, it is furthermore possible also to add branching agents at a rate of 0.02 to 3.6 mol % (relative to the dihydroxy compound). Suitable branching agents are the compounds suitable for polycarbonate production having three and more functional groups, preferably those having three or more than three phenolic OH groups. Examples of suitable branching agents are phloroglucinol,
4,6-dimethyl-2,4,6-tri-(4-hydroxyphenyl)heptane,
1,3,5-tri-(4-hydroxyphenyl)benzene,
1,1,1-tri-(4-hydroxyphenyl)ethane,
tri-(4-hydroxyphenyl)phenylmethane,
2,2-bis-[4,4-bis(4-hydroxyphenyl)cyclohexyl]propane,
2,4-bis-(4-hydroxyphenylisopropyl)phenol,
2,6-bis-(2-hydroxy-5-methylbenzyl)-4-methylphenol, 2-(4-hydroxyphenyl)-2-(2,4-dihydroxyphenyl)propane,
hexa-[4-(4-hydroxyphenylisopropyl)phenyl] orthoterephthalic acid ester,
tetra-(4-hydroxyphenyl)methane,
tetra-[4-(4-hydroxyphenylisopropyl)phenoxy]methane,
1,4-bis-[4',4''-dihydroxytriphenyl)methyl]benzene,
α,α',α''-tris-(4-hydroxyphenyl)-1,3,4-triisopropenylbenzene,
isatin biscresol,
pentaerythritol,
2,4-dihydroxybenzoic acid,
trimesic acid,
cyanuric acid.

1,1,1-Tri-(4-hydroxyphenyl)ethane and isatin biscresol are particularly preferred.

The process according to the invention is generally performed at temperatures of between 75° C. and 325° C. and pressures of 1 bar to 0.01 mbar.

The process according to the invention is, for example, performed by, in the first stage, melting the diphenols, carbonic acid diesters and catalyst and optionally the alkylphenols and branching agents at temperatures of 75° C. to 225° C., preferably of 105° C. to 235° C., particularly preferably of 120° C. to 190° C., under standard pressure in 0.1 to 5hours, preferably on 0.25 to 3 hours. Then the oligocarbonate is produced by distilling off the monophenol by applying a vacuum and increasing the temperature. In the final step, the polycarbonate is produced by polycondensation by further increasing the temperature to 240° C. to 325° C. at a pressure of <2 mbar.

The process according to the invention may be performed both continuously and discontinuously, specifically, for example, in stirred tanks, thin film evaporators, stirred tanks connected in series, extruders, kneaders, simple disk reactors or high viscosity reactors.

The polycarbonates obtainable according to the invention are isolated, for example, by discharging, spinning and pelletising.

The polycarbonates obtainable using the process according to the invention may have weight average molecular weights $M_W$ of between approx. 2000 and 150000, preferably of between approx. 4500 and 55000, wherein $M_W$ is determined from relative solution viscosity in dichloromethane or in mixtures of identical quantities by weight of phenol/o-dichlorobenzene, wherein calibration is performed by light scattering.

The polycarbonates obtainable according to the invention exhibit the conventional OH end group contents known from the literature, which may be determined photometrically with titanium tetrachloride.

The polycarbonates produced using the process according to the invention exhibit good mechanical properties, elevated transparency and contain no solvents.

Incorporation of the introduced alkylphenols is determined in the case of cumylphenol by $^{13}$C-NMR spectroscopy, in the case of other alkylphenols by $^1$H-NMR spectroscopy. On this basis, the percentage of the introduced chain terminator present as an end group in the polycarbonate was calculated.

The properties of the polycarbonates produced according to the invention may be improved by adding auxiliary substances and reinforcing materials. Such substances and materials which may, inter alia, be considered are: stabilisers, flow auxiliaries, mould release agents, flame retardants, pigments, finely divided minerals, fibrous materials, heat stabilisers, such as for example alkyl and aryl phosphites, phosphates, phosphanes, low molecular weight carboxylic acid esters, halogen compounds, salts, chalk, silica flour, glass and carbon fibres, pigments and combinations thereof.

Other polymers, for example polyolefins, polyurethanes, polyesters and polystyrene, may also be mixed into the polycarbonates according to the invention.

These substances are preferably added to the finished polycarbonate in conventional apparatus, but, if required, may be added at another stage of the process according to the invention.

The polycarbonates obtainable using the process according to the invention may be processed in conventional machinery, for example in extruders or injection moulding machines, using conventional methods to form any desired mouldings, for example to form films or sheets.

These polycarbonate mouldings may be used industrially, for example, in optical and electrical engineering applications.

EXAMPLES

Comparative Example 1

45.60 g (0.2 mol) of bisphenol A, 47.08 g (110 mol % relative to bisphenol A) of diphenyl carbonate, 3.7 mg (0.03 mol % relative to bisphenol A) of boric acid and 2.12 g (5 mol % relative to bisphenol A) of 4-cumylphenol are weighed out into a 500ml three-necked flask equipped with a stirrer, internal thermometer and Vigreux column (30cm, mirrored) with bridge. Atmospheric oxygen is removed from the apparatus by applying a vacuum and purging with nitrogen (3 times) and the mixture is melted at 180° C. and stirred for 30 minutes. 36.5 mg (0.03 mol % relative to bisphenol A) of a 15% ammonium hydroxide solution are then added, as is 0.5 mg (0.003 mol % relative to bisphenol A) of sodium hydrogen carbonate, and stirring is continued for a further 30 minutes. The temperature is raised to 210° C. and the vacuum increased to 200 mbar and the resultant phenol removed by distillation. After 1 hour, the temperature is increased to 240° C. and the vacuum is improved to 150 mbar after 20 minutes. After a further 20 minutes, the pressure is reduced to 100 mbar and kept at this level for 20 minutes. The pressure is then reduced to 15 mbar for 30 minutes. The temperature is then raised to 270° C., the vacuum improved to 0.5 mbar and stirring continued for a further 2 hours. The results are summarised in Table 1.

Comparative Example 2

As Comparative Example 1, except that 22 mg (0.03 mol % relative to bisphenol A) of a 25% ammonium hydroxide solution and 5 mg (0.0003 mol % relative to bisphenol A) of a 1% sodium hydrogen carbonate solution are added. The results are summarised in Table 1.

Comparative Example 3

45.66 g (0.2 mol) of bisphenol A, 47.13 g (110 mol % relative to bisphenol A) of diphenyl carbonate, 22 mg (0.03 mol % relative to bisphenol A) of a 25% ammonium hydroxide solution, 5 mg (0.0003 mol % relative to bisphenol A) of a 1% sodium hydrogen carbonate solution and 2.12 g (5 mol % relative to bisphenol A) of 4-cumylphenol are weighed out into a 500 ml three-necked flask equipped with a stirrer, internal thermometer and Vigreux column (30 cm, mirrored) with bridge. Atmospheric oxygen is removed from the apparatus by applying a vacuum and purging with nitrogen (3 times) and the mixture is melted at 150° C. The temperature is raised to 190° C. and the vacuum increased to 100 mbar and the resultant phenol removed by distillation. After 20 minutes, the temperature is increased to 235° C. and the vacuum improved to 60 mbar. After 15 minutes, the temperature is raised to 250° C. and, after a further 15 minutes, the vacuum increased to 5 mbar. The temperature is then raised to 280° C. and the pressure reduced to 0.5 mbar after 15 minutes. After a further 15 minutes, stirring is continued for a further 30 minutes at 300° C. The results are summarised in Table 1.

TABLE 1

| Comparative Example | Solution viscosity | Alkylphenol introduced [mol%] | Alkylphenol found [mol%] | Alkylphenol incorporated [%] |
|---|---|---|---|---|
| 1 | 1.142 | 5 | 3.7 | 74 |
| 2 | 1.167 | 5 | 3.5 | 75 |
| 3 | 1.146 | 5 | 3.8 | 76 |

Example 1

As Comparative Example 2, except that 4.9 mg (0.004 mol % relative to bisphenol A) of tetraphenylphosphonium phenolate (apportioned as a mixed crystal containing 30 wt. % of phenol relative to the mixed crystal) are added instead of tetramethyl-ammonium hydroxide. No sodium hydrogen carbonate is added. The results are summarised in Table 2.

Example 2

As Example 1, but no boric acid is added. The results are summarised in Table 2.

Example 3

As Comparative Example 3, except that 45.66 g (0.2 mol) of bisphenol A, 46.21 g (108 mol % relative to bisphenol A) of diphenyl carbonate, 4.9 mg (0.004 mol % relative to bisphenol A) of tetraphenylphosphonium phenolate (apportioned as a mixed crystal containing 30 wt. % of phenol relative to the mixed crystal) and 1.49 g (4 mol % relative to bisphenol A) of 4-phenoxyphenol are weighed out.

Example 4

As Example 3, except that 45.84 g (107 mol % relative to bisphenol A) of diphenyl carbonate and 1.22 g (2 mol % relative to bisphenol A) of 3-pentadecylphenol instead of 4-phenoxyphenol are weighed out.

Example 5

As Example 3, except that 45.51 g (106 mol % relative to bisphenol A) of diphenyl carbonate and 3.32 g (5 mol % relative to bisphenol A) of cumylphenylphenyl carbonate instead of 4-phenoxyphenol are weighed out. The results are summarised in Table 2.

TABLE 2

| Example | Solution viscosity | Alkylphenol introduced [mol%] | Alkylphenol found [mol%] | Alkylphenol incorporated [%] |
|---|---|---|---|---|
| 1 | 1.134 | 5 | 4.0 | 80 |
| 2 | 1.160 | 5 | 4.2 | 84 |
| 3 | 1.158 | 4 | 3.2 | 80 |

TABLE 2-continued

| Example | Solution viscosity | Alkylphenol introduced [mol%] | Alkylphenol found [mol%] | Alkylphenol incorporated [%] |
|---|---|---|---|---|
| 4 | 1.161 | 2 | 2.0 | 100 |
| 5 | 1.113 | 5 | 4.2 | 84 |

What is claimed is:

1. A process for the production of polycarbonates from bisphenols and carbonic acid diesters, in the presence of an alkyl group-substituted phenol as a chain terminator, wherein the phenol used as chain terminator is introduced in free form or as a compound transesterifiable under the conditions of synthesis, characterized in that phosphonium salts are used as the catalyst.

2. The process according to claim 1, characterized in that the phosphonium catalyst is used in a concentrations of $10^{-2}$ mol to $10^{-6}$ mol, relative to 1 mol of bisphenol.

3. The process of claim 1 characterized in that the catalyst used is tetraphenylphosphonium phenolate.

4. The process of claim 1 characterized in that sodium ions are added in concentrations of 0 to 500 ppb.

5. The process according to claim 4 characterized in that the sodium ion is introduced as sodium phenolate.

6. The process of claim 1 characterized in that the phenol used as chain terminator is introduced in quantities of 0.4–17 mol % relative to the diphenol.

7. The process according to claim 1, characterized in that the chain terminator is a member selected from the group consisting of tritylphenol, cumylphenol, phenoxyphenol and pentadecylphenol.

8. A process for the synthesis of polycarbonate comprising reacting in the presence of at least one phosphonium salt as catalyst, at least one diphenol, at least one carbonic acid diester, and at least one alkyl group-substituted phenol chain terminator, said chain terminator being in free form or as a transesterifiable compound under the conditions of the synthesis.

9. The process of claim 8 wherein the phosphonium catalyst is present in an amount of $10^{-2}$ to $10^{-6}$ mol, relative to 1 mol of diphenol.

10. The process of claim 8 wherein the catalyst is tetraphenyl phosphonium phenolate.

11. The process of claim 8 further comprising sodium ions in an amount of 0 to 500 ppb.

12. The process of claim 11 wherein the sodium ions are introduced as sodium phenolate.

13. The process of claim 8 wherein the phenol is present in an amount of 0.4–17 mol % relative to the diphenol.

14. The process of claim 8 wherein the chain terminator is a member selected from the group consisting of tritylphenol, cumylphenol, phenoxyphenol and pentadecylphenol.

15. The polycarbonate prepared by the process of claim 8.

16. A molded article comprising the polycarbonate of claim 15.

17. A method of using the polycarbonates of claim 15 comprising molding an article by a thermoplastic process.

18. The process of claim 1 wherein the phosphonium salt conforms to the formula

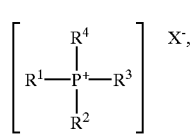

(I)

wherein $R^{1-4}$ independently one of the others denote $C_1$–$C_{18}$ alkyl, $C_6$–$C_{14}$ aryl, $C_7$–$C_{12}$ aralkyl or $C_5$–$C_6$ cycloalkl, and $X^-$ denotes a member selected from the group consisting of sulfate, hydrogen sulfate, hydrogen carbonate, carbonate, acetate, hydridoborate, hydrogen phosphate, halide and an alkoxide of the formula OR, wherein R is $C_6$–$C_{14}$ aryl or $C_7$–$C_{12}$ aralkyl.

19. The process of claim 8 wherein the phosphonium salt conforms to the formula

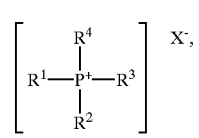

(I)

wherein $R^{1-4}$ independently one of the others denote $C_1$–$C_{18}$ alkyl, $C_6$–$C_{14}$ aryl, $C_7$–$C_{12}$ aralkyl or $C_5$–$C_6$ cyclolkyl, and $X^-$ denotes a member from the group consisting of sulfate, hydrogen sulfate, hydrogen carbonate, carbonate, acetate, hydridoborate, hydrogen phosphate, halide and an alkoxide of the formula OR, wherein R is $C_6$–$C_{14}$ aryl or $C_7$–$C_{12}$ aralkyl.

* * * * *